(12) United States Patent
Kaku et al.

(10) Patent No.: US 6,873,132 B2
(45) Date of Patent: Mar. 29, 2005

(54) ELECTRIC MOTOR CONTROL DEVICE

(75) Inventors: Souki Kaku, Fukuoka (JP); Hideki Honda, Fukuoka (JP); Ryuichi Oguro, Fukuoka (JP); Hidekazu Miyagawa, Fukuoka (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 32 days.

(21) Appl. No.: 10/343,955

(22) PCT Filed: Aug. 3, 2001

(86) PCT No.: PCT/JP01/06682
§ 371 (c)(1),
(2), (4) Date: Feb. 4, 2003

(87) PCT Pub. No.: WO02/13368
PCT Pub. Date: Feb. 14, 2002

(65) Prior Publication Data
US 2004/0090198 A1 May 13, 2004

(30) Foreign Application Priority Data
Aug. 8, 2000 (JP) .................................. 2000-239786

(51) Int. Cl.$^7$ ................................................ H02P 5/28
(52) U.S. Cl. ..................... 318/798; 318/632; 318/805
(58) Field of Search ............................ 318/798–804, 318/632, 805

(56) References Cited

U.S. PATENT DOCUMENTS 4,338,559 A * 7/1982 Blaschke et al. ........... 318/805
5,461,293 A * 10/1995 Rozman et al. ............ 318/603
5,532,571 A * 7/1996 Masaki et al. ............. 318/809
5,729,113 A * 3/1998 Jansen et al. .............. 318/799
5,874,821 A   2/1999 Monleone
5,919,114 A * 7/1999 Kamada et al. ............ 477/159
6,008,618 A   12/1999 Bose et al.

FOREIGN PATENT DOCUMENTS

| JP | 05-236777  | 9/1993  |
| JP | 10-337070  | 12/1998 |
| JP | 2000-092881| 3/2000  |

* cited by examiner

*Primary Examiner*—Rina Duda
(74) *Attorney, Agent, or Firm*—Knobbe Martens Olson & Bear, LLP

(57) ABSTRACT

Host control section 8 is provided with simulation model 8c for simulating the signal transmission characteristics of an electric motor control device. Host control section 8 performs an operation on the actual position command signal θref that is supplied from the host device in accordance with the simulation model, calculates the speed and position of the electric motor corresponding to the actual position command signal θref, and applies this speed and position as first simulation speed signal ωF and first simulation position signal θF, respectively, with each second control sampling period t2. Host control section 8 further generates a linear combination of θref−θF and ωF using, as combination coefficients, constants determined by parameters that characterize the simulation model, and supplies this linear combination as feedforward torque signal TFF for each second control sampling period t2. In this way, the occurrence of error between the actual position signal and the simulation position signal can be prevented even when the control sampling period of the feedforward operation differs from the control sample cycle of the feedback operation.

18 Claims, 11 Drawing Sheets

Prior Art

//PAGE CONTENT

ELECTRIC MOTOR CONTROL DEVICE

This application is the U.S. National Phase under 35 U.S.C. §371 of International Application PCT/JP01/06682, filed Aug. 3, 2001, which claims priority to Japanese Patent Application No. 2000-239786, filed Aug. 8, 2000. The International Application was published under PCT Article 21(2) in a language other than English.

TECHNICAL FIELD

The present invention relates to a control device of an electric motor (such as a dc electric motor, an induction electric motor, a synchronous electric motor, or a linear motor) that drives a load machine such as a table or robot arm in machine tool.

BACKGROUND ART

The manufacturing industry is now widely employing two-degrees-of-freedom control devices having a feedback control system that provides second simulation torque signals and torque commands to, and a feedforward control system that provides first simulation torque signals to a machine system that comprises: a load machine such as a table or robot arm in a machine tool; a drive device such as a dc electric motor, an induction electric motor, a synchronous electric motor, an electromagnet, or a linear motor that drives the load machine; and a transmission mechanism that links the load machine and the drive device.

Examples of such devices are described in Japanese Patent Laid-Open No. 119402/1992 and Japanese Patent Laid-Open No. 138223/1992. FIG. 1 is a block diagram showing an example of a two-degrees-of-freedom control device of the prior art.

As shown in FIG. 1, the position control device of the prior art is provided with: motor 3, feedforward signal operational circuit 21, rotation detector 20, position control circuit 22, speed control circuit 23, and control means (torque control circuit) 24. Electric motor 3 drives load machine 1 by way of torque transfer mechanism 2. Feedforward signal operational circuit 21 receives rotation angle command signals of the electric motor $\theta_{ms}$ from command generator 7 and, by means of a prescribed functional operation that includes at least two integrating operations, provides a simulation rotation angle signal $\theta_o$, a simulation speed signal $\omega_o$, and a first simulation torque signal $T_o$ as output. Rotation detector 20 detects the rotational speed and rotation angle of the electric motor. Position control circuit 22 supplies a first speed signal based on the simulation rotation angle signal $\theta_o$ and the actual rotation angle signal $\theta_m$ provided from the rotation detector 20. Speed control circuit 23 provides as output a second simulation torque signal $T_1$ based on the simulation speed signal $\omega_o$, the first speed signal, and the actual speed signal $\omega_m$ provided from the rotation detector 20. Control means 24 controls the torque of the electric motor 3 based on the first simulation torque signal $T_0$ and the second simulation torque signal $T_1$. This circuit configuration allows high-response position control performance.

When the control sampling time period of the feedforward operation becomes greater than the control sampling time period of the feedback operation, however, the difference in the sampling times causes a discrete modeling error even though the numerical model of the feedforward may match the object of control. As a result, deviation occurs between the actual rotation angle signal and the simulation rotation angle signal, and overshoot or vibration may therefore occur in the actual rotation angle signal.

It is an object of the present invention to provide an electric motor control device capable of realizing superior control performance in which deviation does not occur between the actual rotation angle signal and the simulation rotation angle signal even when the control sampling time period of the feedforward operation differs from the control sampling time period of the feedback operation.

DISCLOSURE OF THE INVENTION

To solve the above-described problems, a first embodiment of the invention is provided with the following means:

a command generator for providing actual command signals;

an actual state observer for observing the state quantities of the machine system and the power conversion circuit and providing an actual response signal with each first control sampling time period;

a host control section for providing a first simulation position signal, a first simulation speed signal, and a first simulation torque signal with each second control sampling time period that is longer than the first control sampling time period based on the actual command signals;

a regulatory control section for providing a second simulation torque signal with each first control sampling time period based on the first simulation position signal, the first simulation speed signal, and the actual response signal;

a torque compensator for providing a third simulation torque signal with each second control sampling time period based on the first simulation position signal, the first simulation speed signal, and the actual response signal; and a torque synthesizer for providing torque commands with each first control sampling time period based on the first simulation torque signal, the second simulation torque signal, and the third simulation torque signal.

A second embodiment of the invention is provided with the following means:

a command generator for providing actual command signals;

an actual state observer for observing the state quantities of the machine system and the power conversion circuit and providing an actual response signal with each first control sampling time period;

a host control section for providing a first simulation position signal, a first simulation speed signal, and a first simulation torque signal based on the actual command signal with each second control sampling time period that is longer than the first control sampling time period;

a regulatory control section for providing second simulation torque signal with each first control sampling time period based on the first simulation position signal, the first simulation speed signal, and the actual response signal;

a torque compensator for providing a third simulation torque signal with each second control sampling time period based on the second simulation torque signal; and a torque synthesizer for providing torque commands with each first control sampling time period based on the first simulation torque signal, the second simulation torque signal and the third simulation torque signal.

A third embodiment of the invention is provided with the following means:

a command generator for providing an actual command signal;

an actual state observer for observing the state quantities of the machine system and the power conversion circuit and providing an actual response signal with each first control sampling time period;

a host control section for providing a first simulation position signal, a first simulation speed signal, and a first simulation torque signal with each second control sampling time period that is longer than the first control sampling time period based on the actual command signal;

a simulation observer for providing an estimated position signal and an estimated speed signal with each first control sampling time period based on a torque command and the actual response signal;

a regulatory control section for providing a second simulation torque signal with each first control sampling time period based on the first simulation position signal, the first simulation speed signal, the estimated position signal, and the estimated speed signal;

a torque compensator for providing a third simulation torque signal with each second control sampling time period based on the second simulation torque signal; and a torque synthesizer for providing a torque command with each first control sampling time period based on the first simulation torque signal, the second simulation torque signal and the third simulation torque signal.

A fourth embodiment of the invention is provided with the following means:

a simulation signal processor for providing a first simulation position signal and a first simulation speed signal;

a host controller for providing a first simulation torque signal based on an actual command signal the first simulation position signal from the simulation signal processor, and the first simulation speed signal from the simulation signal processor;

a simulation regulatory controller for providing a fourth simulation signal based on the first simulation position signal θF from the simulation signal processor and the first simulation speed signal ωF from the simulation signal processor;

an adder for providing a first simulation signal based on the first simulation torque signal and the fourth simulation signal; and a simulation model for providing a second simulation signal and a third simulation signal based on the first simulation signal, wherein the first simulation position signal and the first simulation speed signal provided by the simulation signal processor are created with each second control sampling time period based on the second simulation signal and the third simulation signal.

A fifth embodiment of the invention is provided with the following means:

a coefficient multiplier for providing an A1 simulation signal based on an A2 simulation signal;

a first integrator for providing the third simulation signal based on the A1 simulation signal;

a second integrator for providing the second simulation signal based on the third simulation signal;

a first subtracter for providing an A3 simulation signal based on the first simulation signal and the second simulation signal;

a first coefficient multiplier for providing an A4 simulation signal based on the A3 simulation signal;

a second subtracter for providing an A5 simulation signal based on the A4 simulation signal and the third simulation signal; and a second coefficient multiplier for providing the A2 simulation signal based on the A5 simulation signal.

A sixth embodiment of the invention is provided with the following means:

a first coefficient multiplier for providing a B1 simulation signal based on the second simulation signal;

an adder for providing a B2 simulation signal based on the B1 simulation signal and the third simulation signal; and a second coefficient multiplier for providing the fourth simulation signal based on the B2 simulation signal.

A seventh embodiment of the invention is provided with the following means:

a first subtracter for providing a C1 simulation signal based on the actual command signal and the first simulation position signal;

a first coefficient multiplier for providing a C2 simulation signal based on the C1 simulation signal;

a second subtracter for providing a C3 simulation signal based on the first simulation speed signal and the C2 simulation signal; and a second coefficient multiplier for providing the first simulation torque signal based on the C3 simulation signal.

An eighth embodiment of the invention is provided with the following means:

a subtracter for providing a D1 simulation signal based on the first simulation position signal and the actual response signal;

a first coefficient multiplier for providing a D2 simulation signal based on the D1 simulation signal;

a differentiator for providing a D3 simulation signal with each first control sampling time period based on the actual response signal;

an adder/subtracter for providing a D4 simulation signal based on the D2 simulation signal and the D3 simulation signal; and a second coefficient multiplier for providing a second simulation torque signal based on the D4 simulation signal.

A ninth embodiment of the invention is provided with the following means:

a subtracter for providing an E1 simulation signal based on the first simulation position signal and the estimated position signal;

a first coefficient multiplier for providing an E2 simulation signal based on the E1 simulation signal;

an adder/subtracter for providing an E3 simulation signal based on the E2 simulation signal, the first simulation speed signal, and the estimated speed signal; and a second coefficient multiplier for providing a second simulation torque signal based on the E3 simulation signal.

A tenth embodiment of the invention is provided with the following means:

a first command compensator for providing an F1 simulation signal with each first control sampling time period based on the first simulation position signal;

a second command compensator for providing an F2 simulation signal with each first control sampling time period based on the first simulation speed signal;

a subtracter for providing an F3 simulation signal based on the F1 simulation signal and the actual response signal;

a first coefficient multiplier for providing an F4 simulation signal based on the F3 simulation signal;

a differentiator for providing an F5 simulation signal with each first control sampling time period based on the actual response signal;

an adder/subtracter for providing an F6 simulation signal based on the F4 simulation signal, the F5 simulation signal, and the F2 simulation signal; and a second coefficient multiplier for providing the second simulation torque signal based on the F6 simulation signal.

An eleventh embodiment of the invention is provided with the following means:

a first command compensator for providing a G1 simulation signal with each first control sampling time period based on the first simulation position signal;

a second command compensator for providing a G2 simulation signal with each first control sampling time period based on the first simulation speed signal;

a subtracter for providing a G3 simulation signal based on the G1 simulation signal and the estimated position signal;

a first coefficient multiplier for providing a G4 simulation signal based on the G3 simulation signal;

an adder/subtracter for providing a G5 simulation signal based on the G4 simulation signal, the estimated speed signal, and the G2 simulation signal; and a second coefficient multiplier for providing a second simulation torque signal based on the G5 simulation signal.

A twelfth embodiment of the invention is provided with the following means:

a command filter for providing an H1 simulation signal based on the second simulation torque signal; and an adder for providing a torque command based on the H1 simulation signal, the first simulation torque signal, and the third simulation torque signal.

A thirteenth embodiment of the invention is provided with the following means:

a command filter for providing an I1 simulation signal based on the second simulation torque signal;

a command compensator for providing an I2 simulation signal with each first control sampling time period based on the first simulation torque signal; and an adder for providing a torque command based on the I1 simulation signal, the third simulation torque signal, and the I2 simulation signal.

A fourteenth embodiment of the invention is provided with the following means:

a subtracter for providing a J1 simulation signal based on the actual response signal and the first simulation position signal;

a first coefficient multiplier for providing a J2 simulation signal based on the J1 simulation signal;

a differentiator for providing a J3 simulation signal with each second control sampling time period based on the actual response signal;

an adder/subtracter for providing a J4 simulation signal based on the J2 simulation signal, the J3 simulation signal, and the first simulation speed signal;

a second coefficient multiplier for providing a J5 simulation signal based on the J4 simulation signal; and a discrete integrator for providing a third simulation torque signal with each second control sampling time period based on the J5 simulation signal.

A fifteenth embodiment of the invention is provided with a discrete integrator for providing a third simulation torque signal with each second control sampling time period based on the second simulation torque signal.

A sixteenth embodiment of the invention is provided with means for configuring the host control section, the torque compensator of the first embodiment, the regulatory control section, and the torque synthesizer by a plurality of processors.

A seventh embodiment of the invention is provided with means for configuring the host control section, the torque compensator of the second embodiment, the regulatory control section, and the torque synthesizer by a plurality of processors.

An eighteenth embodiment of the invention is provided with means for configuring the host control section, the torque compensator of the third embodiment, the simulation observer, the regulatory control section, and the torque synthesizer by a plurality of processors.

In the first embodiment of the invention, constructing the host control section in due consideration of the characteristics of the regulatory control section and the machine system enables preventing the vibration and overshoot that may occur in the control performance in an electric motor control device of the prior art when the host control section is constructed based on a control sampling time period that differs from that of regulatory control. When the host control section executes control with a control sampling time period differing from that of regulatory control, with processors having the same processing capability, the control process of the regulatory control section can be carried out with a shorter control sampling time period while the more complex control process is executed in the host control section, and a more robust feedback characteristics can thus be obtained. Further, the introduction of the first torque compensator enables the realization of a simpler control process of the regulatory control section and enables a the control process of the regulatory control section to be carried out with a shorter control sampling time period, and further, enables a simplification of the construction of the host control section in due consideration of the characteristics of the regulatory control section and machine system. Finally, the introduction of the first torque compensator that processes with a control sampling time period differing from that of the regulatory control section enables the appropriate design for each of the regulatory control section and the first torque compensator, can facilitate the design of a control system that accords with the differing characteristics of the machine system exhibited in the high-frequency region and low-frequency region, and thus can realize superior control performance.

In the second embodiment of the invention, the use of only a second simulation torque by the second torque compensator both enables a reduction of the amount of data communication between the second torque compensator and regulatory control section and also allows a simpler construction of the second torque compensator. An electric motor control device can therefore be realized with a shorter control sampling time period with a processor having the same processing capability, thereby enabling the prevention of the vibration and overshoot that may occur in an electric motor control device of the prior art when the host control section is constructed with a control sampling time period that differs from that of the regulatory control, and moreover, allowing realization of superior control performance.

In the third embodiment of the invention, the introduction of the simulation observer allows a reduction of the noise included in the actual response signal. As a result, the control gain of the host control section, regulatory control section, and a second controller can be set to a greater level, thereby enabling superior control performance.

In the fourth embodiment of the invention, the addition of a simulation regulatory controller and a simulation signal processor to the host control section of the prior art not only facilitates the realization of a host control section operable on the basis of the second control sampling time period by giving due consideration to the characteristics of the regulatory control section and machine system, but also enables prevention of the vibration and overshoot that may occur in an electric motor control device of the prior art when the host control section is constructed with a control sampling time period differing from that of the regulatory control. As a result, superior control performance can be realized.

In the fifth embodiment of the invention, constructing the simulation model by a rigid body system results in a simpler simulation model when the mechanical resonance frequency of the mechanical system is high, and thus enables not only the prevention of vibration and overshoot that may occur in the control performance in an electric motor control device of the prior art when the host control section is constructed with a control sampling time period that differs from that of the regulatory control, but also allows a reduction of the amount of computation required for the electric motor control system.

In the sixth embodiment of the invention, constructing the simulation regulatory controller by a P-P control system enables the realization of a simpler simulation regulatory controller. Such a construction not only enables the prevention of vibration and overshoot that may occur in the electric motor control device of the prior art when the host control section is constructed with a control sampling time period differing from that of the regulatory control section, but also enables a reduction in the amount of computation required for the electric motor control device. In addition, the parameters of the simulation regulatory controller can be more easily set.

In the seventh embodiment of the invention, constructing the host controller by a P-P control system enables the realization of a simpler host controller. Such a construction not only enables the prevention of overshoot and vibration that may occur in the electric motor control device of the prior art when the host control section is constructed with a control sampling time period differing from that of the regulatory control, but also enables a reduction of the amount of computation required for the electric motor control device. In addition, the parameters of the host controller can be more easily set.

In the eighth and ninth embodiments of the present invention, constructing the regulatory control section by a P-P control system facilitates the realization of the host controller. Such a construction not only enables the prevention of vibration and overshoot that may occur in the electric motor control device of the prior art when the host control section is constructed with a control sampling time period differing from that of the regulatory control, but also enables a reduction of the amount of computation required for the electric motor control device. In addition, the parameters of the regulatory control section can be more easily set. Further, when the host control section is constructed in due consideration of the regulatory control, the construction of the host control section can be made simpler.

In the tenth and eleventh embodiments of the invention, the F1 or G1 simulation signal and the F2 or G2 simulation signal are generated at the second control sampling time periods based on the first simulation position signal and first simulation speed signal that are updated on the basis of the first control sampling time period while taking into consideration the difference between the first control sampling time period and second control sampling time period, and these signals are applied as input to the regulatory control section of the prior art, thereby enabling smoothing of the second simulation torque signal. Such a construction can prevent the vibration and overshoot that may occur in the electric motor control device of the prior art when the host control section is constructed with a control sampling time period that differs from that of the regulatory control section.

In the twelfth embodiment of the invention, the addition of a command filter not only enables a reduction of the vibration component included in the second simulation torque signal but also enables the prevention of vibration and overshoot that may occur in the electric motor control device of the prior art when the host control section is constructed with a control sampling time period that differs from that of regulatory control.

In the thirteenth embodiment of the invention, the first simulation torque signal that is updated at the first control sampling time periods is generated at the second control sampling time periods while taking into consideration the difference between the first control sampling time period and second control sampling time period. This generated torque signal is then supplied as input to the torque synthesizer of the prior art as the I2 simulation signal to enable smoothing of the torque command and thereby enable prevention of the vibration and overshoot that may occur in the electric motor control device of the prior art when the host control section is constructed with a control sampling time period that differs from that of the regulatory control.

In the fourteenth embodiment of the invention, constructing the first torque compensator by a P-P-I control system not only enables a prevention of the vibration and overshoot that may occur in the electric motor control device of the prior art when the host control section is constructed with a control sampling time period that differs from that of the regulatory control, but also enables a reduction of the amount of calculation required for the electric motor control device. In addition, the parameters of the first torque compensator can be more easily set.

In the fifteenth embodiment of the invention, constructing the second torque compensator by an I control system not only enables the prevention of vibration and overshoot that may occur in the electric motor control device of the prior art when the host control section is constructed with a control sampling time period that differs from that of the regulatory control, but also enables a reduction in the amount of calculation required for the electric motor control device. In addition, the parameters of the second torque compensator can be more easily set.

In the sixteenth embodiment to eighteenth embodiment of the invention, construction by a plurality of processors not only enables the prevention of the vibration and overshoot that may occur in the electric motor control device of the prior art when the host control section is constructed with a control sampling time period that differs from that of the regulatory control, but also enables a dramatic reduction of the control sampling time of the electric motor control device.

BEST MODE FOR CARRYING OUT THE INVENTION

Embodiments of the present invention are next described based on working examples.

WORKING EXAMPLE 1

The working example 1 of the present invention will be set forth in detail below.

Figure 1:
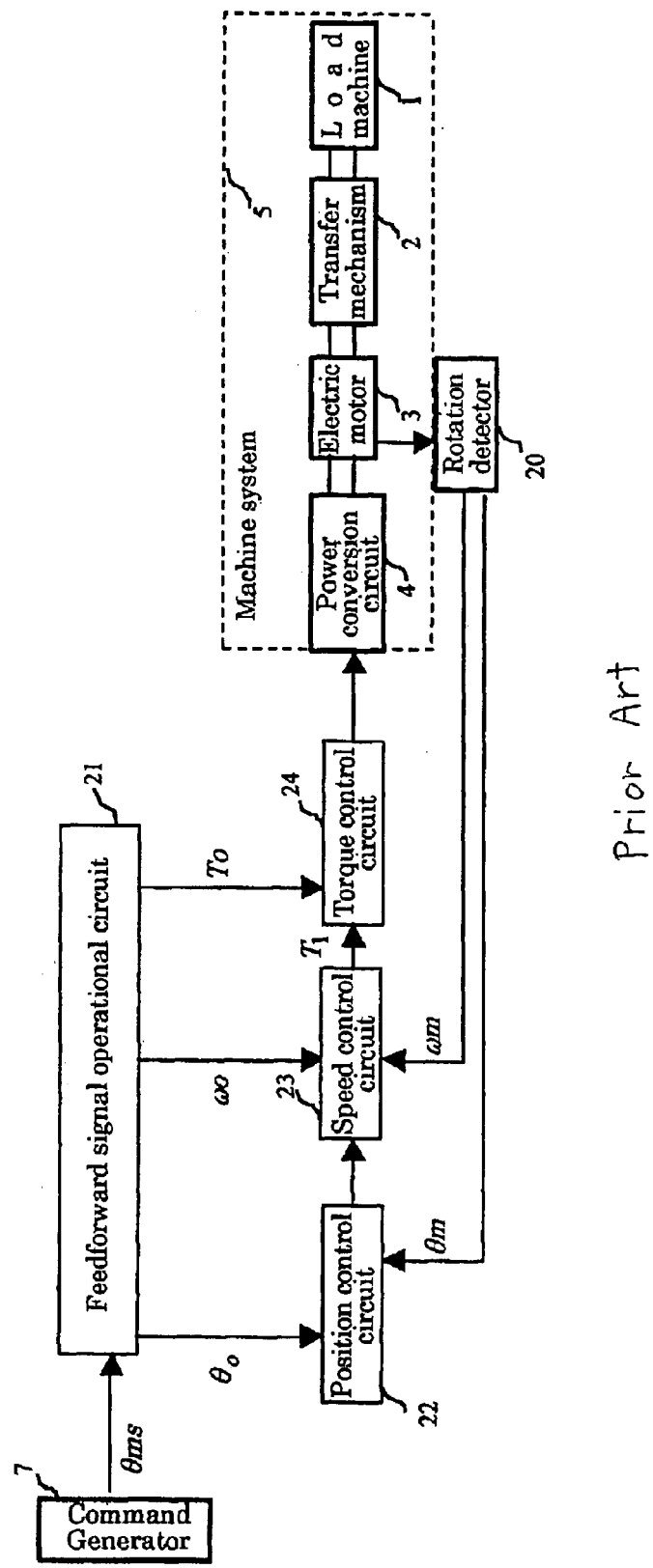
FIG. 1 is a block diagram showing the prior art.
Figure 2:
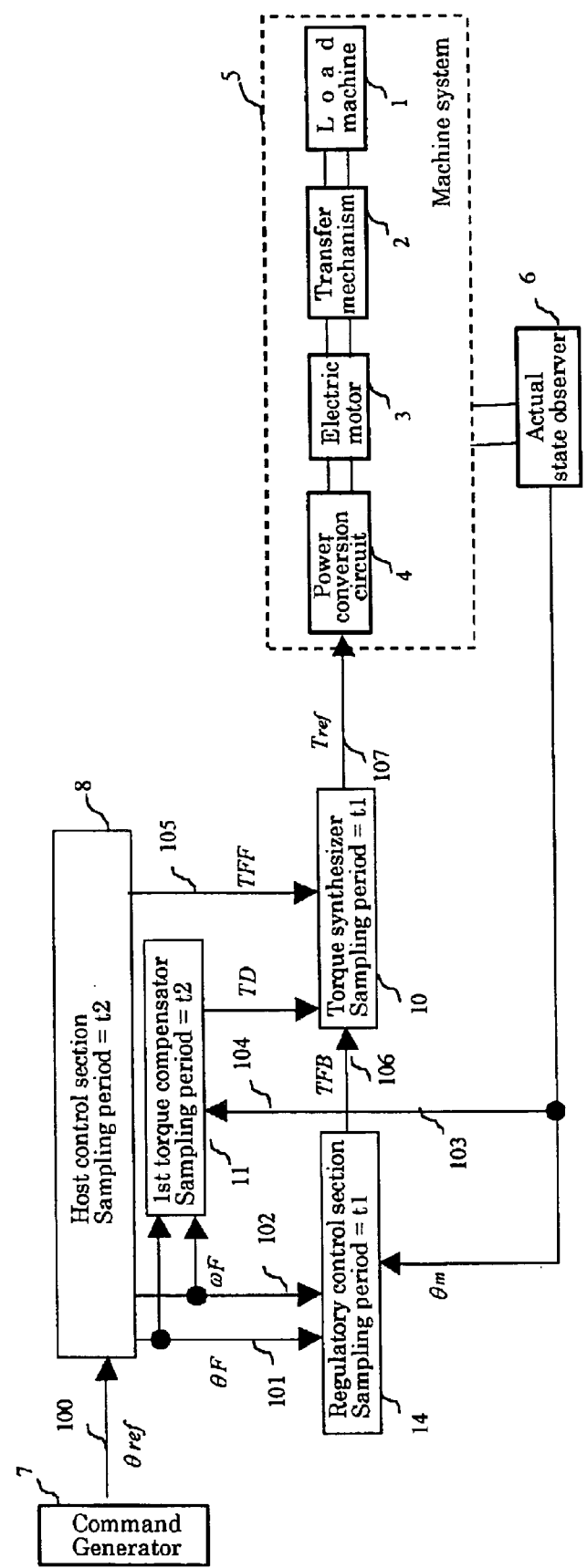
FIG. 2 is a block diagram showing working example 1 of the present invention.

We next refer to FIG. 2 regarding the details of working example 1 of the present invention.

FIG. 2 is a block diagram showing an overall view of working example 1 of the present invention. In FIG. 2, the working example of the present invention comprises: machine system 5 comprising load machine 1, transfer mechanism 2, electric motor 3, and power conversion circuit 4; actual state observer 6, command generator 7, host control section 8, regulatory control section 9, torque synthesizer 10, and first torque compensator 11.

Machine system 5, actual state observer 6, and command generator 7 are identical to the machine system, the rotation detector and the command generator of prior-art devices, respectively. θref is an actual command signal that has been generated by command generator 7. θm is an actual response signal that has been generated by actual state observer 6.

Based on actual command signal θref, host control section 8 provides first simulation position signal θF, first simulation speed signal ωF, and first simulation torque signal TFF with each second control sampling time period t2.

Based on first simulation position signal θF, first simulation speed signal ωF, and actual response signal θm, regulatory control section 9 provides second simulation torque signal TFB with each first control sampling time period t1.

Based on first simulation position signal θF, first simulation speed signal ωF, and actual response signal θm, first torque compensator 11 provides third simulation torque signal TD with each second control sampling time period t2.

Based on first simulation torque signal TFF, second simulation torque signal TFB, and third simulation torque signal TD, torque synthesizer 10 provides torque command Tref.

In host control section 8, first simulation position signal θF, first simulation speed signal ωF, and first simulation torque signal TFF are generated by expressing the equations (1), (2), and (3) below in the discrete-time representation with respect to second control sampling time period t2.

$$\theta F = [1/(T1^*s^2 + T2^*s + 1)]^* \theta \text{ref} \tag{1}$$

$$\omega F = [s/(T1^*s^2 + T2^*s + 1)]^* \theta \text{ref} \tag{2}$$

$$TFF = [Jm^*s^2/(T1^*s^2 + T2^*s + 1)]^* \theta \text{ref} \tag{3}$$

Here, T1, T2 and Jm are set according to the characteristics of machine system 5 and regulatory control section 9.

In first torque compensator 11, third simulation torque signal TD is generated by expressing equation (4) below in discrete-time representation with respect to second control sampling time period t2.

$$TD = [(K1^*(\theta F - \theta m) - K2^*(\omega F - \omega m)]/s, \tag{4}$$

where K1 and K2 are the control gain.

In regulatory control section 9, the second simulation torque signal (TFB) is generated by expressing equation (5) below in discrete-time representation with respect to control sampling time period t1.

$$TFB = K3^*(\theta F - \theta m) + K4^*(\omega F - \omega m), \tag{5}$$

where K3 and K4 are the control gain.

In torque synthesizer 10, torque commands are generated as follows with each first control sampling time period t1:

$$T\text{ref} = TFF + TD + TFB \tag{6}$$

WORKING EXAMPLE 2

Figure 3:
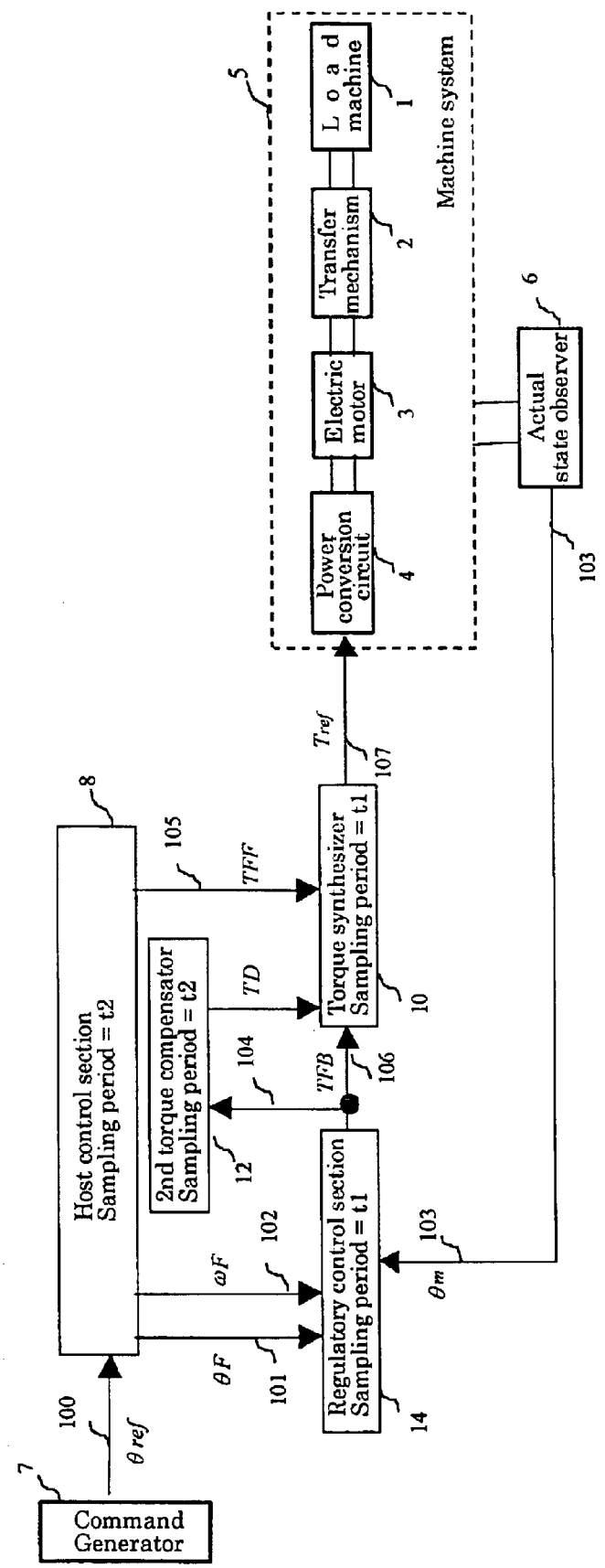
FIG. 3 is a block diagram showing working example 2 of the present invention.

We next refer to FIG. 3 to describe the details of working example 2 of the present invention. FIG. 3 is a block diagram showing the overall configuration of the present working example. In FIG. 3, the working example of the present invention includes: machine system 5 that comprises load machine 1, transfer mechanism 2, electric motor 3, and power conversion circuit 4; actual state observer 6; command generator 7; host control section 8; regulatory control section 9; torque synthesizer 10; and second torque compensator 12.

Second torque compensator 12 provides third simulation torque signal TD with each second control sampling time t2 based on second simulation torque signal TFB.

In second torque compensator 12, third simulation torque signal TD is generated by expressing equation (7) below in the discrete-time representation with respect to second control sampling time period t2.

$$TD = K5^*TFB/s \tag{7}$$

WORKING EXAMPLE 3

Figure 4:
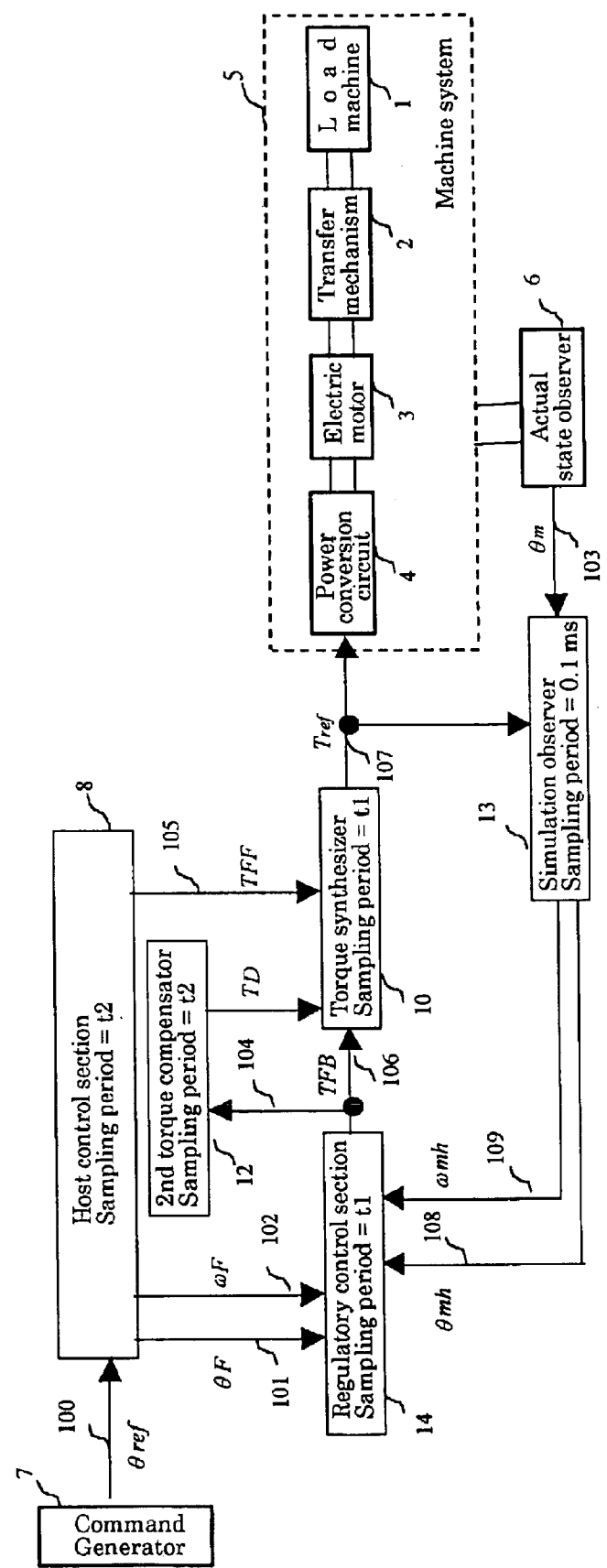
FIG. 4 is a block diagram showing working example 3 of the present invention.

We next refer to FIG. 4 to describe details regarding working example 3 of the present invention.

FIG. 4 is a block diagram showing the overall configuration of this working example. In FIG. 4, the working example of the present invention includes: machine system 5 that comprises load machine 1, transfer mechanism 2, electric motor 3, and power conversion circuit 4; actual state observer 6; command generator 7; host control section 8; regulatory control section 14; torque synthesizer 10; simulation observer 13; and second torque compensator 12.

Simulation observer 13 provides estimated position signal θmh and estimated speed signal ωmh at first control sampling time t1 based on actual response signal θm and torque command Tref.

Regulatory control section 14 provides second simulation torque signal TFB with each first control sampling time period t1 based on first simulation position signal θF, first simulation speed signal ωF, estimated position signal θmh, and estimated speed signal ωmh.

In regulatory control section 14, second simulation torque signal TFB is generated in accordance with equation (8).

$$TFB=K3*(\theta F-\theta mh)+K4(\omega F-\omega mh) \quad (8)$$

In simulation observer 13, estimated position signal θmh and estimated speed signal ωmh are generated as follows: let k1 be the sample counter value counted with each first control sampling time period t1 and (k1) represent the value of the time variable at time t1*k1; then $$e(k1)=\theta m(k1)-\theta mh(k1) \quad (9)$$

$$\theta mh(k1+1)=\theta mh(k1)+\omega mh(k1)*t1+L1*e(k1) \quad (10)$$

$$\omega mh(k1+1)=\omega mh(k1)+Tref(k1)*t1/Jm+L2*e(k1) \quad (11)$$

WORKING EXAMPLE 4

Figure 5:
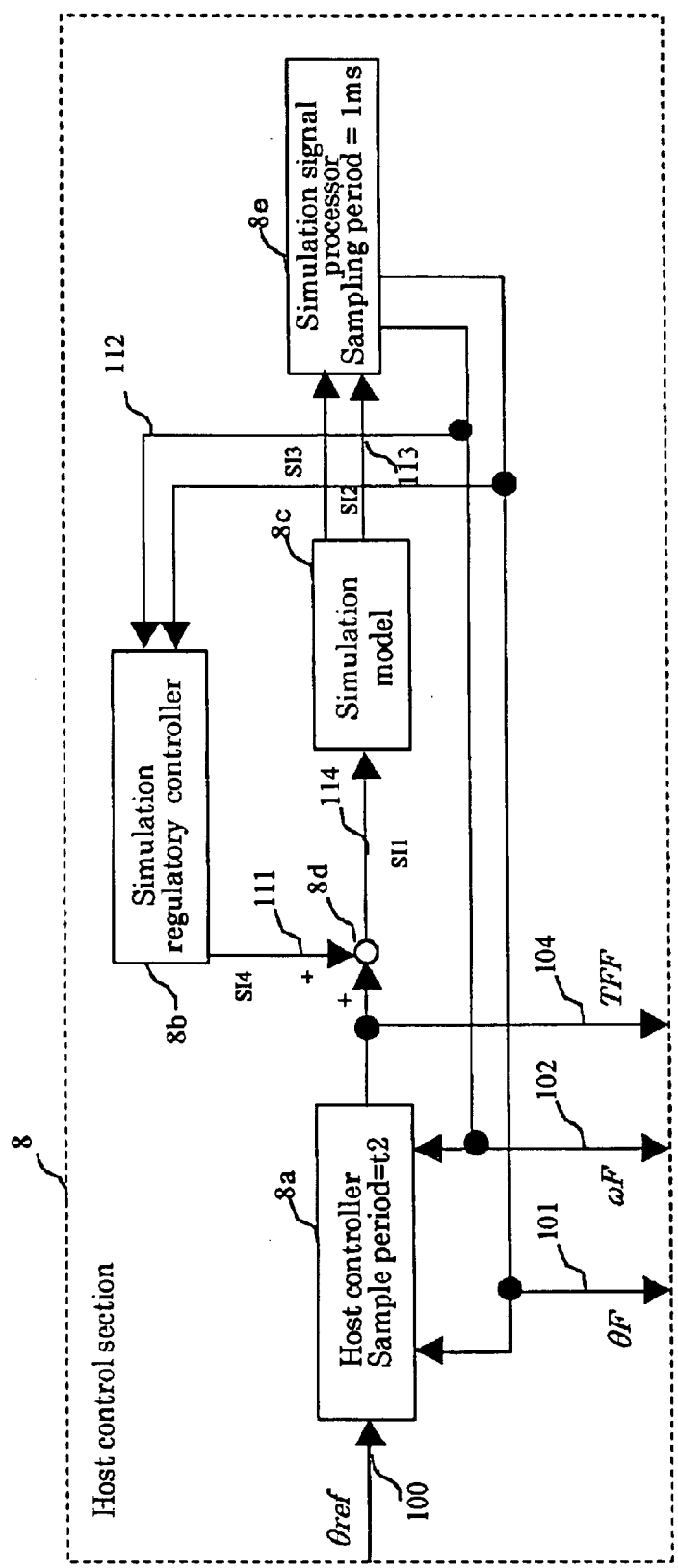
FIG. 5 is a block diagram showing working example 4 of the present invention.

We next refer to FIG. 5 to explain the details of this working example. FIG. 5 is a block diagram showing working example 4 of the present invention. In FIG. 5, host control section 8 of the working example of the present invention is provided with host controller 8a, simulation regulatory controller 8b, adder 8d, simulation model 8c, and simulation signal processor 8e.

Host controller 8a provides first simulation torque signal TFF based on actual command signal θref, first simulation position signal θF, and first simulation speed signal ωF.

Simulation regulatory controller 8b provides fourth simulation signal SI4 based on first simulation position signal θF and first simulation speed signal ωF.

Adder 8d provides first simulation signal SI1 based on first simulation torque signal TFF and fourth simulation signal SI4.

Simulation model 8c provides second simulation signal SI2 and third simulation signal SI3 based on first simulation signal SI1. The contents of simulation signals SI2 and SI3 will be explained later referring to FIG. 6.

Simulation signal processor 8e provides first simulation position signal θF and first simulation speed signal ωF with each second control sampling time period t2 based on second simulation signal SI2 and the third simulation signal SI3.

In host controller 8a, first simulation torque signal TFF is generated as follows:

$$TFF=K5*(\theta ref-\theta F)-K6*\theta F \quad (12)$$

In simulation regulatory controller 8b, fourth simulation signal SI4 is generated as follows:

$$SI4=K7*\theta F+K8*\omega F \quad (13)$$

In adder 8d, first simulation signal SI1 is generated as follows:

$$SI1=TFF-SI4 \quad (14)$$

Second simulation signal SI2 and third simulation signal SI3 are generated in simulation model 8c.

In simulation signal processor 8e, first simulation position signal θF and first simulation speed signal ωF are generated as follows: let k2 be the sample counter value counted with each second control sampling time period t2 (=1 ms), and (k2) represent the value of time variable at time t2*k2; then $$\theta F(t)=SI2(k2*t2) \quad (17)$$

$$\omega F(t)=SI3(k2*t2), \quad (18)$$

where $$k2*t2 \leq (k2+1)*t2 \quad (19)$$

WORKING EXAMPLE 5

Figure 6:
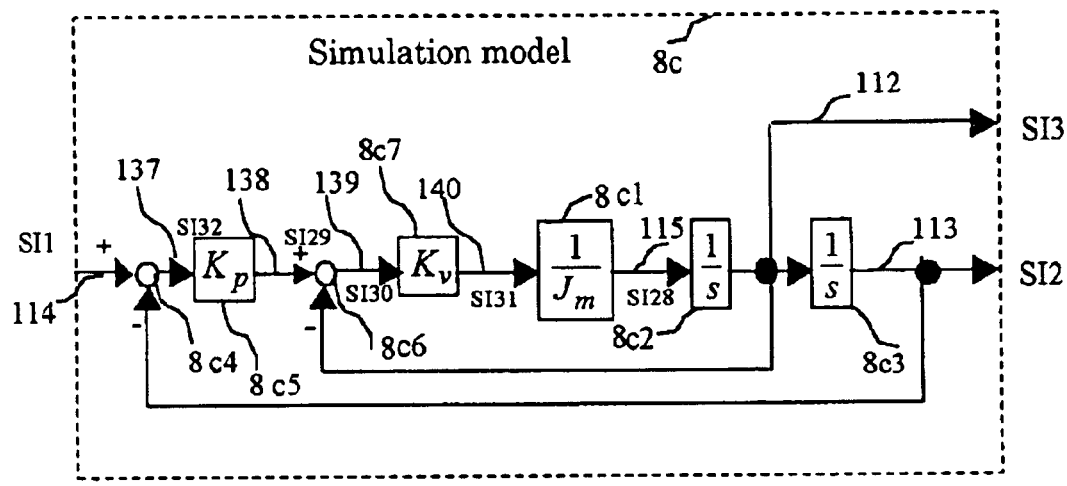
FIG. 6 is a block diagram showing working example 5 of the present invention.

We next refer to FIG. 6 to explain the details of working example 5 of the present invention. FIG. 6 is a block diagram showing this working example. In FIG. 6, simulation model 8c of the working example of the present invention comprises: subtracter 8c4, coefficient multiplier 8c5, subtracter 8c6, coefficient multiplier 8c7, coefficient multiplier 8c1, integrator 8c2, and integrator 8c3.

In subtracter 8c4, simulation signal SI32 is generated as follows:

$$SI32=SI1-SI2 \quad (20)$$

In coefficient multiplier 8c5, the coefficient is set to Kp and simulation signal SI29 is generated as follows:

$$SI29=Kp*SI32 \quad (21)$$

In subtracter 8c6, simulation signal SI30 is generated as follows:

$$SI30=SI29-SI3 \quad (22)$$

In coefficient multiplier 8c7, the coefficient is set to Kv, and simulation signal SI31 is generated as follows:

$$SI31=Kv*SI30 \quad (23)$$

In coefficient multiplier 8c1, the coefficient is set to 1/Jm and simulation signal SI28 is generated as follows:

$$SI28=SI31/Jm \quad (24)$$

Simulation signal SI3 is generated as follows:

$$SI3=SI28/s \quad (25)$$

Simulation signal SI2 is generated as follows:

$$SI2=SI3/s \quad (26)$$

WORKING EXAMPLE 6

Figure 7:
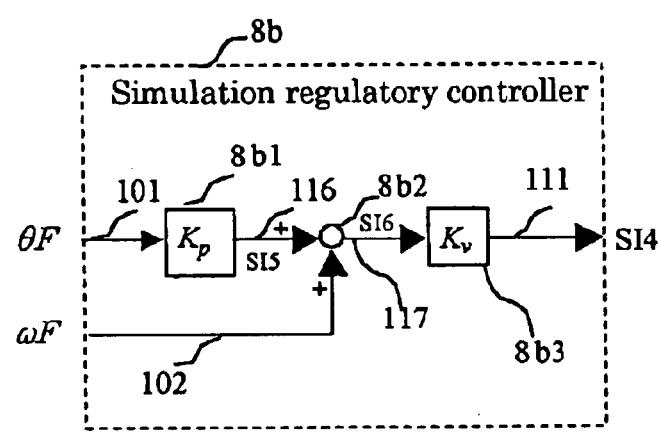
FIG. 7 is a block diagram showing working example 6 of the present invention.

We next refer to FIG. 7 to describe details regarding working example 6 of the present invention. FIG. 7 is a block diagram showing the present working example. In FIG. 7, simulation regulatory controller 8b of the working example of the present invention is provided with coefficient multiplier 8b1, adder 8b2, and coefficient multiplier 8b3.

In coefficient multiplier 8b1, the coefficient is set to Kp and simulation signal SI5 is generated as follows:

$$SI5=Kp*\theta F \quad (27)$$

In adder 8b2, simulation signal SI6 is generated as follows:

$$SI6 = \omega F + SI5 \quad (28)$$

In coefficient multiplier 8b3, the coefficient is set to Kv and simulation signal SI4 is generated as follows:

$$SI4 = Kv * SI6 \quad (29)$$

WORKING EXAMPLE 7

Figure 8:
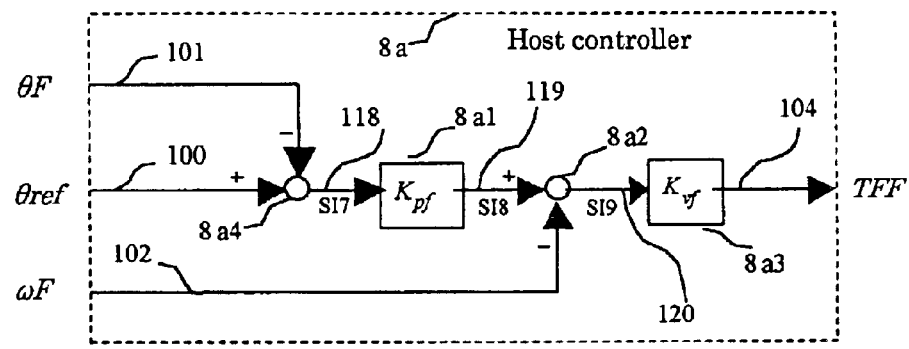
FIG. 8 is a block diagram showing working example 7 of the present invention.

We next refer to FIG. 8 to describe details regarding working example 7 of the present invention. FIG. 8 is a block diagram showing the present working example 7. In FIG. 8, host controller 8a of the working example of the present invention comprises subtracter 8a4, coefficient multiplier 8a1, subtracter 8a2, and coefficient multiplier 8a3.

In subtracter 8a4, simulation signal SI7 is generated as follows:

$$SI7 = \theta ref - \theta F \quad (30)$$

In coefficient multiplier 8a1, the coefficient is set to Kpf, and simulation signal SI8 is generated as follows:

$$SI8 = Kpf * SI7 \quad (31)$$

In subtracter 8a2, simulation signal SI9 is generated as follows:

$$SI9 = SI8 - \omega F \quad (32)$$

In coefficient multiplier 8a3, the coefficient is set to Kvf, and first simulation torque signal TFF is generated as follows:

$$TFF = Kvf * SI9 \quad (33)$$

WORKING EXAMPLE 8

Figure 9:
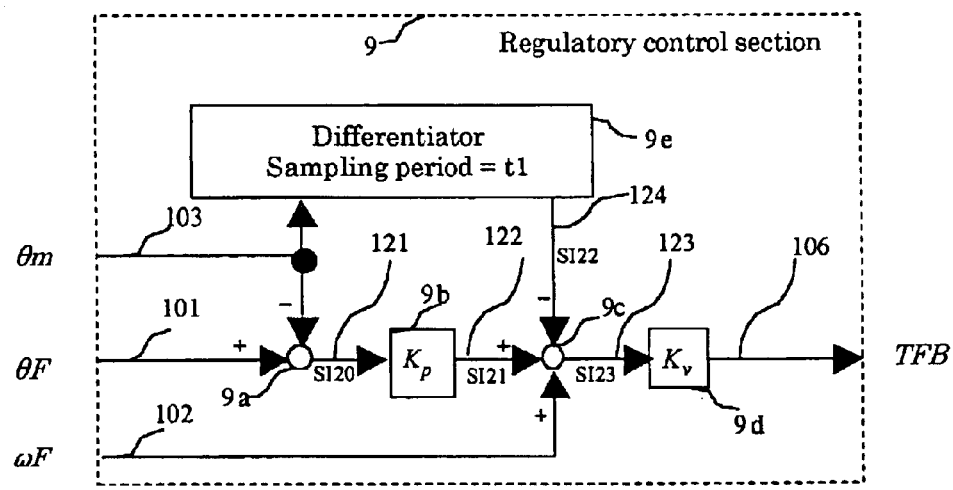
FIG. 9 is a block diagram showing working example 8 of the present invention.

We next refer to FIG. 9 to explain details regarding working example 8 of the present invention. FIG. 9 is a block diagram showing the present working example. In FIG. 9, regulatory control section 9 of the working example of the present invention is made up by: subtracter 9a, coefficient multiplier 9b, adder/subtracter 9c, coefficient multiplier 9d, and differentiator 9e.

In subtracter 9a, simulation signal SI20 is generated as follows:

$$SI20 = \theta F - \theta m \quad (34)$$

In coefficient multiplier 9b, the coefficient is set to Kp, and simulation signal SI21 is generated as follows:

$$SI21 = SI20 * Kp \quad (35)$$

In differentiator 9e, simulation signal SI22 is generated as follows:

$$SI22(k1) = \theta m(k1) - \theta m(k1-1) \quad (36)$$

In adder/subtracter 9c, simulation signal SI23 is generated as follows:

$$SI23 = SI21 + \omega F - SI22 \quad (37)$$

In coefficient multiplier 9d, the coefficient is set to Kv, and second simulation torque signal TFB is generated as follows:

$$TFB = SI23 * Kv \quad (38)$$

WORKING EXAMPLE 9

Figure 10:
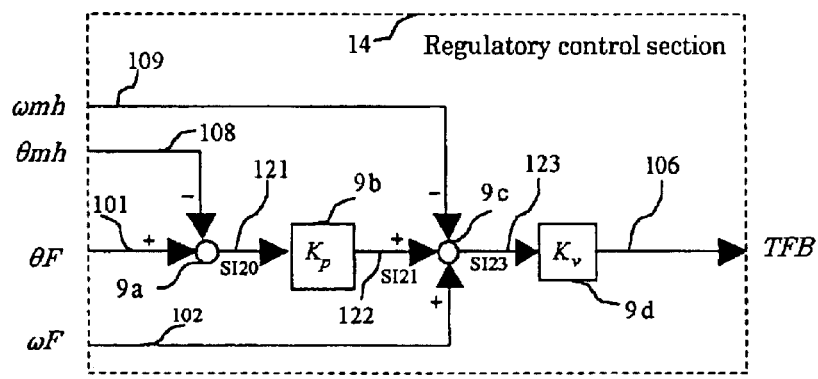
FIG. 10 is a block diagram showing working example 9 of the present invention.

We next refer to FIG. 10 to describe details regarding working example 9 of the present invention. FIG. 10 is a block diagram showing the present working example. In FIG. 10, regulatory control section 14 of the working example of the present invention is provided with subtracter 9a, coefficient multiplier 9b, adder/subtracter 9c, and coefficient multiplier 9d.

In subtracter 9a, simulation signal SI20 is generated as follows:

$$SI20 = \theta F - \omega mh \quad (39)$$

In coefficient multiplier 9b, the coefficient is set to Kp, and simulation signal SI21 is generated as shown in equation (35).

In adder/subtracter 9c, simulation signal SI23 is generated as follows:

$$SI23 = SI21 + \omega F - \omega mh \quad (40)$$

In coefficient multiplier 9d, the coefficient is set to Kv, and second simulation torque signal TFB is generated as shown in equation (38).

WORKING EXAMPLE 10

Figure 11:
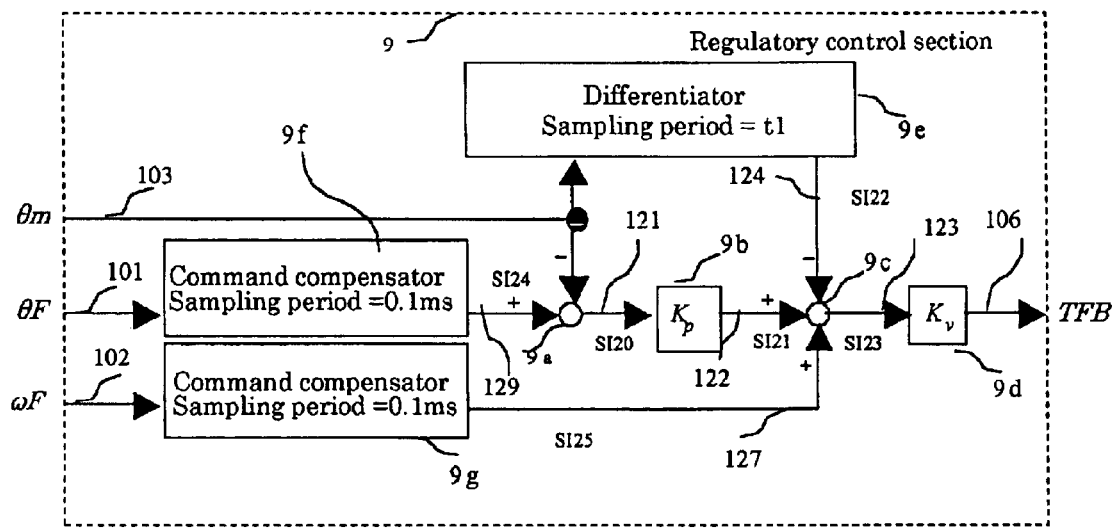
FIG. 11 is a block diagram showing working example 10 of the present invention.

We next refer to FIG. 11 to describe details regarding working example 10 of the present invention. FIG. 11 is a block diagram showing the present working example. In FIG. 11, regulatory control section 9 of the working example of the present invention is provided with: subtracter 9a, coefficient multiplier 9b, adder/subtracter 9c, coefficient multiplier 9d, differentiator 9e, command compensator 9f, and command compensator 9g.

In command compensator 9f, simulation signal SI24 is generated as follows:

$$SI24(k1) = \theta F(k2-1) + (\theta F(k2)-1)) * i/I \quad (41)$$

where:

$$k1 = i + (k2-1) * I \quad (42)$$

$$I = t2/t1 \quad (43)$$

$$0 \leq i < I \quad (44)$$

In command compensator 9g, simulation signal SI25 is generated as follows:

$$SI25(k1) = \omega F(k2-1) + (\omega F(k2)-1)) * i/I \quad (45)$$

In this embodiment, sampling time period t1 of command compensators 9f and 9g is 0.1 ms.

In subtracter 9a, simulation signal SI20 is generated as follows:

$$SI20 = SI24 - \theta m \quad (46)$$

In coefficient multiplier 9b, the coefficient is set to Kp, and simulation signal SI21 is generated as shown in equation (35).

In differentiator 9e, simulation signal SI22 is generated as shown in equation (36).

In adder/subtracter 9c, simulation signal SI23 is generated as follows:

$$SI23 = SI21 + SI25 - SI22 \quad (47)$$

In coefficient multiplier 9d, the coefficient is set to Kv, and second simulation torque signal TFB is generated as shown in equation (38).

WORKING EXAMPLE 11

Figure 12:
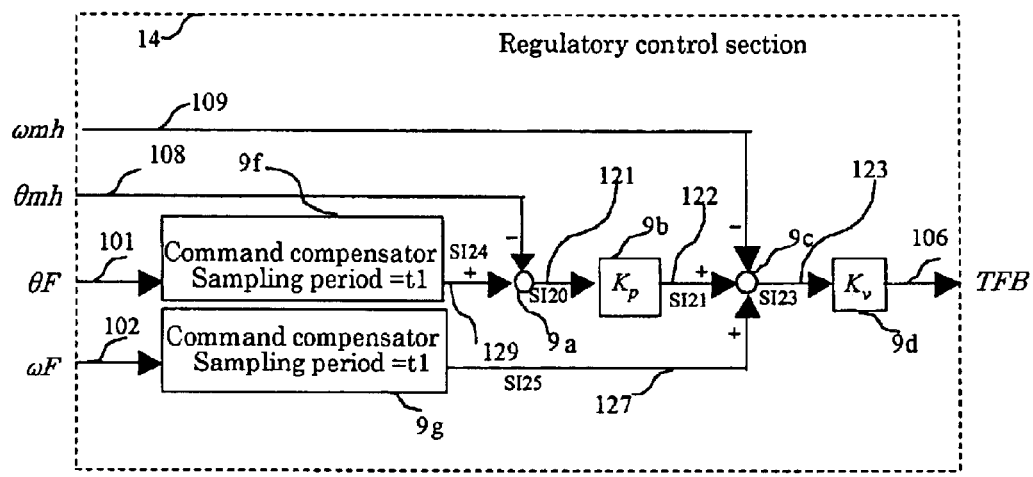
FIG. 12 is a block diagram showing working example 11 of the present invention.

We next refer to FIG. 12 to describe details regarding working example 11 of the present invention. FIG. 12 is a block diagram showing the present working example. In FIG. 12, regulatory control section 14 of the working example of the present invention is provided with subtracter 9a, coefficient multiplier 9b, adder/subtracter 9c, coefficient multiplier 9d, command compensator 9f, and command compensator 9g.

In command compensator 9f, simulation signal SI24 is generated as shown in equation (41). In command compensator 9g, simulation signal SI25 is generated as shown in equation (45). In subtracter 9a, simulation signal SI20 is generated as follows:

$$SI20 = SI24 - \theta mh \tag{48}$$

In coefficient multiplier 9b, the coefficient is set to Kp, and simulation signal SI21 is generated as shown in equation (35).

In adder/subtracter 9c, simulation signal SI23 is generated as follows:

$$SI23 = SI21 + SI25 - \omega mh \tag{49}$$

In coefficient multiplier 9d, the coefficient is set to Kv, and second torque signal TFB is generated as shown in equation (38).

WORKING EXAMPLE 12

Figure 13:
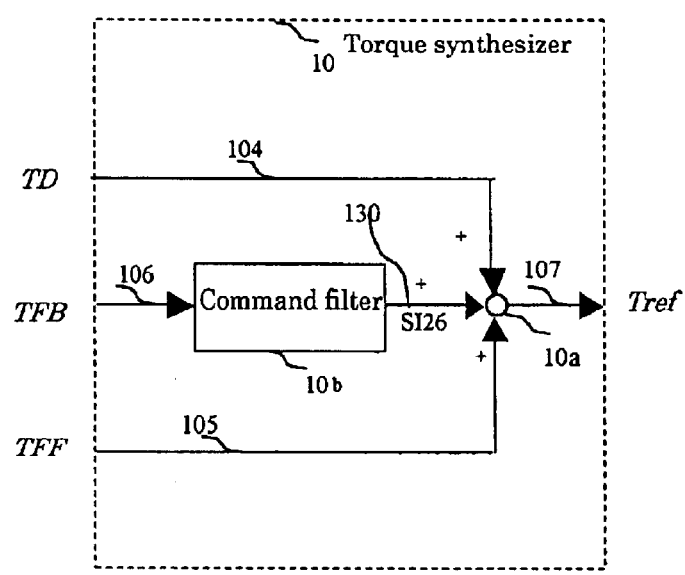
FIG. 13 is a block diagram showing working example 12 of the present invention.

We next refer to FIG. 13 to describe details regarding working example 12 of the present invention. FIG. 13 is a block diagram showing the present working example 12. In FIG. 13, torque synthesizer 10 of the working example of the present invention is provided with command filter 10b and adder 10a.

In command filter 10b, simulation signal SI26 is generated as follows:

$$SI26 = TFB/(tf*s+1) \tag{50}$$

where tf stands for a time constant of filter 10b. In adder 10a, torque command Tref is generated as follows:

$$Tref = SI26 + TD + TFF \tag{51}$$

WORKING EXAMPLE 13

Figure 14:
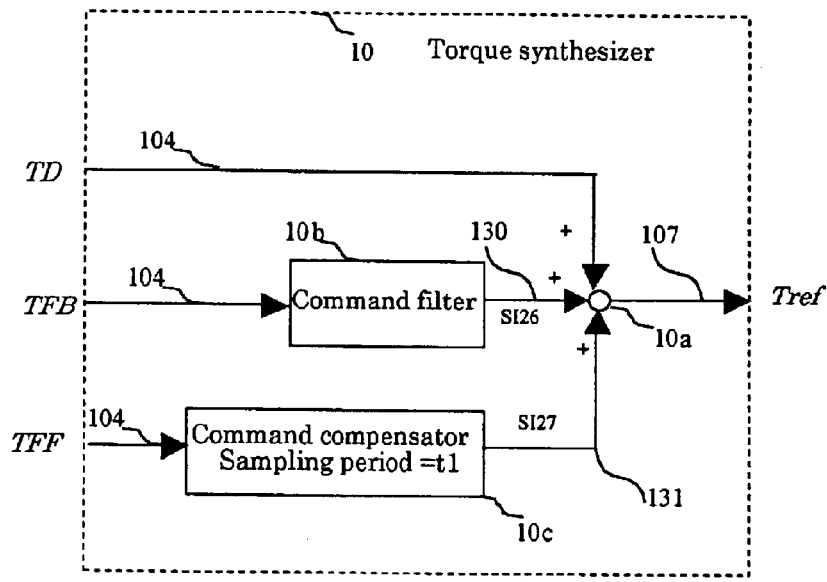
FIG. 14 is a block diagram showing working example 13 of the present invention.

We next refer to FIG. 14 to describe details regarding working example 13 of the present invention. FIG. 14 is a block diagram showing the present working example. In FIG. 14, torque synthesizer 10 of the working example of the present invention is provided with command filter 10b, adder 10a, and command compensator 10c.

In command filter 10b, simulation signal SI26 is generated as shown in equation (50).

In command compensator 10c, simulation signal SI27 is generated as follows:

$$SI27(k1) = TFF(k2-1) + (TFF(k2) - TFF(k2-1))*i/l \tag{52}$$

In adder 10a, torque command Tref is generated as follows:

$$Tref = SI26 + TD + SI27 \tag{53}$$

WORKING EXAMPLE 14

Figure 15:
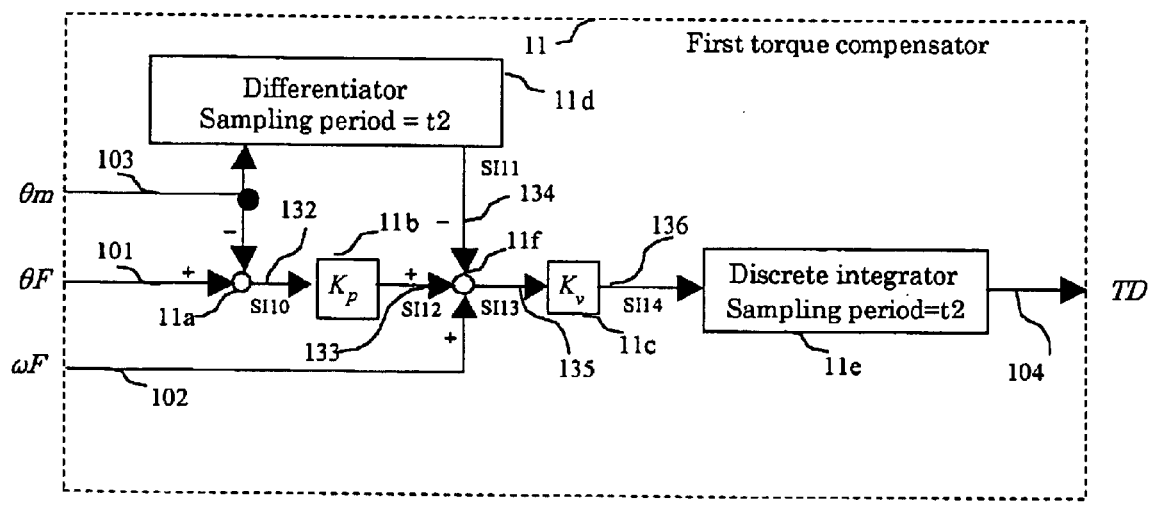
FIG. 15 is a block diagram showing working example 14 of the present invention.

We next refer to FIG. 15 to describe details regarding working example 14 of the present invention. FIG. 15 is a block diagram showing the present working example. In FIG. 15, first torque compensator 11 of the working example of the present invention is provided with: subtracter 11a, coefficient multiplier 11b, coefficient multiplier 11c, adder/subtracter 11f, differentiator 11d, and discrete integrator 11e.

In subtracter 11a, simulation signal SI10 is generated as follows:

$$SI10 = \theta F - \theta m \tag{54}$$

In coefficient multiplier 11b, the coefficient is set to Kp, and simulation signal SI12 is generated as follows:

$$SI12 = Kp*SI10 \tag{55}$$

In differentiator 11d, simulation signal SI11 is generated as follows:

$$SI11(k2) = \theta m(k2) - \theta m(k2-1) \tag{56}$$

In adder/subtracter 11f, simulation signal SI13 is generated as follows:

$$SI13 = SI12 + \omega F - SI11 \tag{57}$$

In coefficient multiplier 11c, the coefficient is set to Kv, and simulation signal SI14 is generated as follows:

$$SI14 = Kv*SI10 \tag{58}$$

In discrete integrator 11e, the coefficient is set to Ki, and third simulation torque signal TD is generated as follows:

$$TD(k2) = TD(k2-1) + Ki*SI14(k2) \tag{59}$$

WORKING EXAMPLE 15

Figure 16:
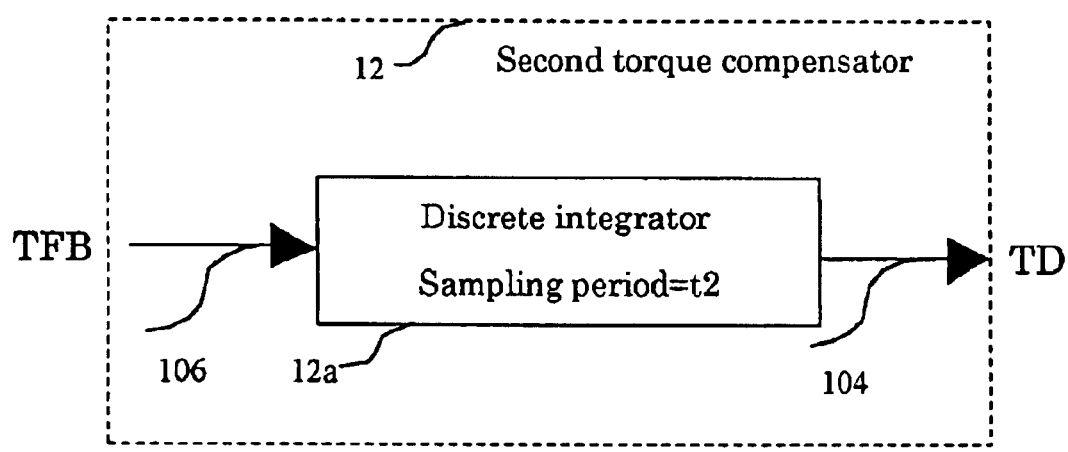
FIG. 16 is a block diagram showing working example 15 of the present invention.

We next refer to FIG. 16 to describe details regarding working example 15 of the present invention. FIG. 16 is a block diagram showing the present working example. In FIG. 16, second torque compensator 12 of the working example of the present invention is provided with discrete integrator 12a.

In discrete integrator 12a, the coefficient is set to Ki, and third simulation torque signal TD is generated as follows:

$$TD(k2) = TD(k2-1) + Ki*TFB(k2) \tag{60}$$

WORKING EXAMPLE 16

Host control section 8, first torque compensator 11, regulatory control section 9, and torque synthesizer 10 shown in the above-described working examples can each be easily realized by means of processors.

WORKING EXAMPLE 17

Host control section 8, second torque compensator 12, regulatory control section 9, and torque synthesizer 10 shown in the above-described working examples can each be easily realized by means of processors.

WORKING EXAMPLE 18

Host control section 8, second torque compensator 12, simulation observer 13, regulatory control section 14, and torque synthesizer 10 can each be easily realized by means of processors.

Potential for use in the Industry

The present invention as described in the foregoing explanation has the following merits:

1) Constructing the host control section with due consideration given to the characteristics of the regulatory control section and machine system can prevent vibration and overshoot that occur in control when the host control section is constructed with a control sampling time period that differs from that of the regulatory control in an electric motor control device of the prior art.
2) By realizing the host control section with a control sampling time period that differs from that of the regulatory control, it becomes feasible using processors having identical processing capabilities to allow the regulatory control section to implement control processing with a shorter control sampling time period while realizing the more complex control process by means of the host control section, whereby more robust feedback characteristics can be obtained.
3) Introducing the first torque compensator simplifies the control process of the regulatory control section and enables the control process of the regulatory control section to be carried out in a shorter control sampling time period, and moreover, can also facilitate the construction of the host control section in due consideration of the characteristics of the regulatory control section and machine system.
4) Introducing the first torque compensator capable of implementing the processing synchronized with control sampling time of a period that differs from that of the control section enables respective designs of the regulatory control section and first torque compensator. The present invention therefore can facilitate the design of a control system in accordance with the different characteristics of the machine system that may occur in the high-frequency region and low-frequency region, and thus realize superior control performance.
5) Because the second torque compensator uses only the second simulation torque, the amount of data communication between the second torque compensator and the regulatory control section can be reduced, and further, a simpler construction can be adopted for the second torque compensator. As a result, an electric motor control device can be realized by means of processors having identical processing capabilities with a shorter control sampling time period.
6) The present invention can prevent vibration and overshoot that may occur in control by an electric motor control device of the prior art when the host control section is constructed based on a control sampling time period that differs from that of the regulatory control. The present invention thus can realize improved control performance.
7) The introduction of a simulation observer enables a reduction of the noise included in an actual response signal. As a result, control gain of the host control section, the regulatory control section, and the second control section can be set to higher levels to enable prevention of the vibration and overshoot that may occur in control by the electric motor control device of the prior art when the host control section is constructed with a control sampling time period differing from that of regulatory control. The present invention thus can realize improved control performance.
8) The addition of a simulation regulatory control section and a simulation signal processor to the host control section of the prior art enables easily realizing, on the basis of the second control sampling time period, a host control section in due consideration of the characteristics of the regulatory control section and the machine system, and furthermore enables preventing the vibration and overshoot that may occur in control by an electric motor control device of the prior art when the host control section is constructed on the basis of a control sampling time period differing from that of the regulatory control, thereby realizing improved control performance.
9) The simulation model and simulation regulatory control section have characteristics typical of a continuous system, whereby each of the parameters of the simulation model and simulation regulatory control section can be more easily set.
10) The construction of the simulation model by a rigid-body system allows easier realization of the simulation model when the mechanical resonance frequency of the machine system is high. The present invention can therefore not only prevent vibration and overshoot that may occur in control by an electric motor control device of the prior art when the host control section is constructed on the basis of a control sampling time period differing from that of the regulatory control, but can also reduce the amount of computation required for the electric motor control device.
11) Because the simulation regulatory control section is constructed by a P-P control system, the simulation regulatory control section can be more simply realized. The present invention can therefore not only prevent vibration and overshoot that may occur in control by an electric motor control device of the prior art when the host control section is constructed on the basis of a control sampling time period differing from that of the regulatory control, but can also reduce the amount of computation required for the electric motor control device.
12) The parameters of the simulation regulatory control section can be more easily set.
13) Constructing the host controller from a P-P control system allows the host controller to be more simply realized.
14) The present invention can therefore not only prevent vibration and overshoot that may occur in control by an electric motor control device of the prior art when the host control section is constructed on the basis of a control sampling time period differing from that of the regulatory control, but can also reduce the amount of computation required for the electric motor control device.
15) The parameters of the host controller can be more easily set.
16) Constructing the regulatory control section in a P-P control system allows the host controller to be more simply realized.
17) The present invention can therefore not only prevent vibration and overshoot that may occur in control by an electric motor control device of the prior art when the host control section is constructed on the basis of a control sampling time period differing from that of the regulatory control, but can also reduce the amount of computation required for the electric motor control device.
18) The parameters of the regulatory control section can be more easily set. Further, when the host control section is constructed with due consideration given to the regulatory control section, the construction of the host control section can be made simpler.
19) Generating the 24th simulation signal and 25th simulation signal at the second control sampling time periods from the first simulation position signal and first simulation speed signal that are updated on the basis of the first control sampling time period while giving due consideration the difference between the first control sampling time period and the second control sampling time period to provide the generated signals to the regulatory control section of the prior art enables smoothing of the second simulation torque signal.

20) The present invention can prevent the vibration and overshoot that may occur in control by an electric motor control device of the prior art when the host control section is constructed on the basis of a control sampling time period differing from that of the regulatory control.

21) The addition of a command filter can not only reduce the vibration component included in the second simulation torque signal, but can also prevent vibration and overshoot that may occur in control by an electric motor control device of the prior art when the host control section is constructed with a control sampling time period that differs from that of regulatory control.

22) Generating the 27th simulation signal at the second control sampling time periods from the first simulation torque signal that is updated on the basis of the first control sampling time period while giving due consideration to the difference between the first control sampling time period and the second control sampling time period to provide the generated simulation signal to the torque synthesizer of the prior art enables smoothing of the torque command.

23) Constructing the first torque compensator from a P-P-I control system can not only prevent the vibration and overshoot that may occur in the control performance in an electric motor control system of the prior art when the host control section is constructed on the basis of a control sampling time period differing from that of the regulatory control, but can also reduce the amount of computation required for the electric motor control device.

24) The parameters of the first torque compensator can be more easily set.

25) Constructing the second torque compensator in an I control system can not only prevent the vibration and overshoot that may occur in the control performance in an electric motor control device of the prior art when the host control section is constructed on the basis of a control sampling time period differing from that of the regulatory control, but can also reduce the amount of computation required for the electric motor control device.

26) The parameters of the second torque compensator can be more easily set.

27) Construction using a plurality of processors can not only prevent the vibration and overshoot that may occur in the control by an electric motor control device of the prior art when the host control section is constructed on the basis of a control sampling time period differing from that of the regulatory control but can also greatly reduce the control sampling time of the electric motor control device.

What is claimed is:

1. An electric motor control device for providing appropriate torque commands to a machine system that comprises: a load machine, a transfer mechanism for transferring power, an electric motor for driving said load machine by way of said transfer mechanism, and a power conversion circuit for providing electric power for driving said electric motor based on said torque commands; said torque commands being provided to said power conversion circuit such that said machine system performs desired movements; and said electric motor control device comprising:

a command generator for providing an actual command signal;

an actual state observer for observing the state quantities of said machine system and providing an actual response signal with each first control sampling time period;

a host control section for providing a first simulation position signal, a first simulation speed signal, and a first simulation torque signal with each second control sampling time period that is longer than said first control sampling time period based on said actual command signal;

a regulatory control section for providing a second simulation torque signal with each first control sampling time period based on said first simulation position signal, said first simulation speed signal, and said actual response signal;

a torque compensator for providing a third simulation torque signal with each second control sampling time period based on said first simulation position signal, said first simulation speed signal, and said actual response signal; and a torque synthesizer for providing torque commands with each first control sampling time period based on said first simulation torque signal, said second simulation torque signal, and said third simulation torque signal.

2. An electric motor control device according to claim 1, wherein said first torque compensator comprises:

a subtracter for providing a J1 simulation signal based on said actual response signal and said first simulation position signal;

a first coefficient multiplier for providing a J2 simulation signal based on said J1 simulation signal;

a differentiator for providing a J3 simulation signal with each second control sampling time period based on said actual response signal;

an adder/subtracter for providing a J4 simulation signal based on said J2 simulation signal, said J3 simulation signal, and said first simulation speed signal;

a second coefficient multiplier for providing a J5 simulation signal based on said J4 simulation signal; and a discrete integrator for providing said third simulation torque signal with each second control sampling time period based on said J5 simulation signal.

3. An electric motor control device according to claim 1, provided with means for configuring said host control section, said torque compensator, said regulatory control section, and said torque synthesizer by a plurality of processors.

4. An electric motor control device for providing appropriate torque commands to a machine system that comprises: a load machine, a transfer mechanism for transferring power, an electric motor for driving said load machine by way of said transfer mechanism, and a power conversion circuit for providing electric power for driving said electric motor based on said torque commands; said torque commands being provided to said power conversion circuit such that said machine system performs desired movements; and said electric motor control device comprising:

a command generator for providing an actual command signal;

an actual state observer for observing the state quantities of said machine system and providing an actual response signal with each first control sampling time period;

a host control section for providing a first simulation position signal, a first simulation speed signal, and a first simulation torque signal with each second control sampling time period that is longer than said first control sampling time period based on said actual command signal;

a regulatory control section for providing a second simulation torque signal with each first control sampling time period based on said first simulation position signal, said first simulation speed signal, and said actual response signal;

a torque compensator for providing a third simulation torque signal with each second control sampling time period based on said second simulation positional signal; and a torque synthesizer for providing torque commands with each first control sampling time period based on said first simulation torque signal, said second simulation torque signal, and said third simulation torque signal.

5. An electric motor control device according to claim 4, provided with means for configuring said host control section, said torque compensator, said regulatory control section, and said torque synthesizer by a plurality of processors.

6. An electric motor control device according to claim 1 or 4, wherein said regulatory control section comprises:

a subtracter for providing a D1 simulation signal based on said first simulation position signal and said actual response signal;

a first coefficient multiplier for providing a D2 simulation signal based on said D1 simulation signal;

a differentiator for providing a D3 simulation signal with each first control sampling time period based on said actual response signal;

an adder/subtracter for providing a D4 simulation signal based on said D2 simulation signal, said D3 simulation signal, and said first simulation speed signal; and a second coefficient multiplier for providing said second simulation torque signal based on said D4 simulation signal.

7. An electric motor control device according to claim 1 or 4, wherein said regulatory control section comprises:

a first command compensator for providing an F1 simulation signal with each first control sampling time period based on said first simulation position signal;

a second command compensator for providing an F2 simulation signal with each first control sampling time period based on said first simulation speed signal;

a subtracter for providing an F3 simulation signal based on said F1 simulation signal and said actual response signal;

a first coefficient multiplier for providing an F4 simulation signal based on said F3 simulation signal;

a differentiator for providing an F5 simulation signal in said first control sampling time period based on said actual response signal;

an adder/subtracter for providing an F6 simulation signal based on said F4 simulation signal, said F5 simulation signal, and said F2 simulation signal; and a second coefficient multiplier for providing said second simulation torque signal based on said F6 simulation signal.

8. An electric motor control device for providing appropriate torque commands to a machine system that comprises: a load machine, a transfer mechanism for transferring power, an electric motor for driving said load machine by way of said transfer mechanism, and a power conversion circuit for providing electric power for driving said electric motor based on said torque commands; said torque commands being provided to said power conversion circuit such that said machine system performs desired movements; and said electric motor control device comprising:

a command generator for providing an actual command signal;

an actual state observer for observing the state quantities of said machine system and providing an actual response signal with each first control sampling time period;

a host control section for providing a first simulation position signal, a first simulation speed signal, and a first simulation torque signal with each second control sampling time period that is longer than said first control sampling time period based on said actual command signal;

a simulation observer for providing an estimated position signal and an estimated speed signal with each first control sampling time period based on a torque command and said actual response signal;

a regulatory control section for providing a second simulation torque signal with each first control sampling time period based on said first simulation position signal, said first simulation speed signal, said estimated position signal, and said estimated speed signal;

a torque compensator for providing a third simulation torque signal with each second control sampling time period based on said second simulation torque signal; and a torque synthesizer for providing a torque command with each first control sampling time period based on said first simulation torque signal, said second simulation torque signal, and said third simulation torque signal.

9. An electric motor control device according to claim 8, wherein said regulatory control section comprises:

a subtracter for providing an E1 simulation signal based on said first simulation position signal and said estimated position signal;

a first coefficient multiplier for providing an E2 simulation signal based on said E1 simulation signal;

an adder/subtracter for providing an E3 simulation signal based on said E2 simulation signal, said first simulation speed signal, and said estimated speed signal; and a second coefficient multiplier for providing said second simulation torque signal based on said E3 simulation signal.

10. An electric motor control device according to claim 8, wherein said regulatory control section comprises:

a first command compensator for providing a G1 simulation signal with each first control sampling time period based on said first simulation position signal;

a second command compensator for providing a G2 simulation signal with each first control sampling time period based on said first simulation speed signal;

a subtracter for providing a G3 simulation signal based on said G1 simulation signal and said estimated position signal;

a first coefficient multiplier for providing a G4 simulation signal based on said G3 simulation signal;

an adder/subtracter for providing a G5 simulation signal based on said G4 simulation signal, said estimated speed signal, and said G2 simulation signal; and a second coefficient multiplier for providing said second simulation torque signal based on said G5 simulation signal.

11. An electric motor control device according to claim 8, provided with means for configuring said host control section, said torque compensator, said simulation observer, said regulatory control section and said torque synthesizer by a plurality of processors.

12. An electric motor control device according to any one of claims 1 through 8, wherein said host control section comprises:
- a simulation signal processor for providing said first simulation position signal and said first simulation speed signal;
- a host controller for providing said first simulation torque signal based on said actual command signal, said first simulation position signal from said simulation signal processor, and said first simulation speed signal from said simulation signal processor;
- a simulation regulatory controller for providing a fourth simulation signal based on said first simulation position signal from said simulation signal processor and said first simulation speed signal from said simulation signal processor;
- a first adder for providing a first simulation signal based on said first simulation torque signal and said fourth simulation; and
- a simulation model for providing a second simulation signal and a third simulation signal based on said first simulation signal,
- wherein said first simulation position signal and said first simulation speed signal provided by said simulation signal processor are created with each second control sampling time period based on said second simulation signal and said third simulation signal.

13. An electric motor control device according to claim 12, wherein said simulation model comprises:
- a first subtracter for providing an A1 simulation signal based on said first simulation signal and said second simulation signal;
- a first coefficient multiplier for providing an A2 simulation signal based on said A1 simulation signal;
- a second subtracter for providing an A3 simulation signal based on said A2 simulation signal and said third simulation signal;
- a second coefficient multiplier for providing an A4 simulation signal based on said A3 simulation signal;
- a third coefficient multiplier for providing an A5 simulation signal based on said A4 simulation signal;
- a first integrator for providing said third simulation signal based on said A5 simulation signal; and
- a second integrator for providing said second simulation signal based on said third simulation signal.

14. An electric motor control device according to claim 12, wherein said simulation regulatory controller comprises:
- a first coefficient multiplier for providing a B1 simulation signal based on said first simulation position signal;
- a second adder for providing a B2 simulation signal based on said B1 simulation signal and said first simulation speed signal; and
- a second coefficient multiplier for providing said fourth simulation signal based on said B2 simulation signal.

15. An electric motor control device according to claim 12, wherein said host controller comprises:
- a first subtracter for providing a C1 simulation signal based on said actual command signal and said first simulation position signal;
- a first coefficient multiplier for providing a C2 simulation signal based on said C1 simulation signal;
- a second subtracter for providing a C3 simulation signal based on said first simulation speed signal and said C2 simulation signal; and
- a second coefficient multiplier for providing said first simulation torque signal based on C3 simulation signal.

16. An electric motor control device according to any one of claims 1 through 8, wherein said torque synthesizer comprises:
- a command filter for providing an H1 simulation signal based on said second simulation torque signal; and
- an adder for providing a torque command based on said H1 simulation signal, said first simulation torque signal, and said third simulation torque signal.

17. An electric motor control device according to any one of claim 1 through 8, wherein said torque synthesizer comprises:
- a command filter for providing an I1 simulation signal based on said second simulation torque signal;
- a command compensator for providing an I2 simulation signal with each first control sampling time period based on said first simulation torque signal; and
- an adder for providing a torque command based on said I1 simulation signal, said third simulation torque signal, and said I2 simulation signal.

18. An electric motor control device according to claim 4 or 8, wherein said torque compensator comprises:
- a discrete integrator for providing said third simulation torque signal with each second control sampling time period based on said second simulation torque signal.

* * * * *